United States Patent
Giaretta et al.

(10) Patent No.: US 8,559,321 B2
(45) Date of Patent: Oct. 15, 2013

(54) MOBILE IP HOME AGENT DISCOVERY

(75) Inventors: Gerardo Giaretta, San Diego, CA (US); George (Georgios) Tsirtsis, London (GB); Kalle I. Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 882 days.

(21) Appl. No.: 12/134,636

(22) Filed: Jun. 6, 2008

(65) Prior Publication Data

US 2009/0010206 A1 Jan. 8, 2009

Related U.S. Application Data

(60) Provisional application No. 60/943,017, filed on Jun. 8, 2007.

(51) Int. Cl.
*G01R 31/08* (2006.01)

(52) U.S. Cl.
USPC .............................. 370/252; 370/328; 455/433

(58) Field of Classification Search
USPC .................. 370/252, 328, 338; 455/426, 433; 713/168; 714/4.1; 709/245, 249
See application file for complete search history.

(56) References Cited

U.S. PATENT DOCUMENTS

| | | | |
|---|---|---|---|
| 6,430,698 B1 * | 8/2002 | Khalil et al. | 714/4.1 |
| 6,487,409 B2 * | 11/2002 | Qing-An | 455/436 |
| 6,501,746 B1 * | 12/2002 | Leung | 370/338 |
| 7,409,549 B1 * | 8/2008 | Leung et al. | 713/168 |
| 7,447,162 B1 * | 11/2008 | Leung et al. | 370/252 |
| 2003/0176188 A1 * | 9/2003 | O'Neill | 455/433 |
| 2004/0148364 A1 | 7/2004 | Kim et al. | |
| 2004/0179539 A1 | 9/2004 | Takeda et al. | |
| 2005/0177647 A1 * | 8/2005 | Anantha et al. | 709/249 |
| 2006/0248230 A1 * | 11/2006 | Kempf et al. | 709/245 |
| 2006/0291422 A1 | 12/2006 | Rochford | |
| 2007/0283149 A1 * | 12/2007 | Devarapalli | 713/168 |

FOREIGN PATENT DOCUMENTS

| | | |
|---|---|---|
| CN | 1531263 A | 9/2004 |
| EP | 1460815 | 9/2004 |
| EP | 1777908 | 4/2007 |

(Continued)

OTHER PUBLICATIONS

C. Perkins, Ed., IP Mobility Support for IPv4, Network Working Group Request for Comments 3220, Jan. 2002, http://www.ietf.org/rfc/rfc3220.txt as accessed May 19, 2011.*

(Continued)

*Primary Examiner* — Jung Park
(74) *Attorney, Agent, or Firm* — Michael J. DeHaemer, Jr.

(57) ABSTRACT

Systems and methodologies are described that facilitate Mobile IP home agent (HA) discovery in a wireless communication system. Discovery of a HA for Mobile IP can be conducted as described herein for a mobile terminal located on a network wherein movement of the terminal is managed by a network-based mobility protocol. For example, various aspects described herein can be utilized for discovery of a HA located in a 3GPP network from 3GPP and/or non-3GPP access. Further, various aspects described herein can be utilized to discover a gateway acting as mobility anchor for a network mobility protocol utilized by the network. As additionally described herein, HA discovery can be conducted in connection with DNS query formation and communication, network attach and/or re-attach procedures, Neighbor Discovery signaling, and/or other procedures.

26 Claims, 17 Drawing Sheets

(56) References Cited

FOREIGN PATENT DOCUMENTS

| JP | 2001268129 A | 9/2001 |
|---|---|---|
| JP | 2004282315 A | 10/2004 |
| RU | 2273104 | 3/2006 |
| RU | 2299418 C1 | 5/2007 |
| WO | WO03032604 A1 | 4/2003 |
| WO | 2004004281 A1 | 1/2004 |
| WO | 2006010382 A1 | 2/2006 |
| WO | WO2008154509 | 12/2008 |

OTHER PUBLICATIONS

International Search Report, PCT/US2008/066355, International Search Authority, European Patent Office, Oct. 24, 2008.

Written Opinion, PCT/US08/066355, International Search Authority, European Patent Office, Oct. 24, 2008.

Giaretta et al., "Mobile IPv6 Bootstrapping in Split Scenario," IETF Standard-Working-Draft, Mar. 3, 2006, vol. mip6, No. 2, Internet Engineering Task Force, CH, XP015043875.

3rd Generation Partnership Project;Technical Specification Group Services and System Aspects;Architecture Enhancements for non-3GPP accesses(Release 8),3GPP TS 23.402 V1.0.0 (May 2007),3GPP.

QUALCOMM Europe,PDN GW discovery for S2c reference point,3GPP TSG CT WG1 Meeting #48 C1-072112,Aug. 20, 2007.

European Search Report—EP12171958—Search Authority—Munich—Aug. 2, 2012.

Taiwan Search Report—TW097121440—TIPO—Dec. 5, 2012.

\* cited by examiner

MOBILE IP HOME AGENT DISCOVERY

CROSS-REFERENCE

This application claims the benefit of U.S. Provisional Application Ser. No. 60/943,017, filed Jun. 8, 2007, and entitled "MOBILE IP HOME AGENT DISCOVERY," the entirety of which is incorporated herein by reference.

BACKGROUND

I. Field

The present disclosure relates generally to wireless communications, and more specifically to techniques for establishing Mobile Internet Protocol (Mobile IP) communication in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Mobile Internet Protocol (Mobile IP or MIP) is a communication protocol that enables transparent routing of data packets to mobile devices in a wireless communication system. Under the Mobile IP protocol, a device can register with a home agent (HA), through which the device obtains a "home" IP address. The home address of the device can then be utilized to route data packets to and/or from the device regardless of the location of the device within a wireless communication network. Conventionally, a mobile device can register with a HA by first discovering a global IP address of the HA and subsequently setting up a security association with the HA based on its discovered IP address. Upon association with the HA, the device can signal updates to the HA relating to the location and/or status of the device. These updates can be utilized by the HA to provide data packets to the device, either directly or indirectly via an access point of a disparate network to which the device has moved.

However, discovery of the IP address of a HA has proven difficult in wireless communication networks where mobility of devices is managed by a network-based mobility protocol, such as General Packet Radio Service (GPRS) Tunneling Protocol (GTP) or the like. For example, the home link for Mobile IP in a given network may be conducted through GPRS or another similar technique such that a mobile device in the network does not need to be aware of the global address of its anchor point and/or HA while in its home network. As a consequence of the mobile device lacking knowledge of the global address of its corresponding HA, mobility of the device is made more complex and difficult. Accordingly, there exists a need for versatile techniques for Mobile IP HA discovery in a wireless communication network.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for identifying a Mobile Internet Protocol (MIP) home agent (HA) in a wireless communication system is described herein. The method can comprise identifying a Packet Data Network Gateway (PDN GW) serving as an anchor point of a network-based mobility protocol used for communication in the wireless communication system; communicating one or more messages to the identified PDN GW containing respective requests for a MIP HA address; and receiving information relating to the MIP HA address from the PDN GW in response to the one or more messages.

Another aspect relates to a wireless communications apparatus, which can comprise a memory that stores data relating to a HA for Mobile IP communication and an access router (AR) that manages the wireless communications apparatus using at least one of Proxy Mobile IP (PMIP) or General Packet Radio Service Tunneling Protocol (GTP). The wireless communications apparatus can further comprise a processor configured to provide one or more messages to the AR requesting a global address for the HA and to receive information corresponding to the global address of the HA in response.

Yet another aspect relates to an apparatus that facilitates discovery of a Mobile IP home agent. The apparatus can comprise means for communicating a request for a global IP address of a home agent to a PDN GW serving as an anchor point of a network-based mobility protocol; and means for receiving information relating to the global IP address of the home agent in response to the request.

Still another aspect relates to a machine-readable medium having stored thereon instructions which, when executed by a machine, cause the machine to perform operations comprising identifying a serving access router serving as a network anchor point for one or more of PMIP or GTP; determining whether a MIP HA is collocated with the serving access router; if a MIP HA is collocated with the serving access router, discovering a global address for the MIP HA; and if a MIP HA is not collocated with the serving access router, establishing a connection with an access router at which a MIP HA is located and discovering a global address for the MIP HA upon establishment of a connection with the access router.

An additional aspect relates to an integrated circuit that executes computer-executable instructions for discovering a global address of a home agent. The instruction can comprise requesting a global address of a home agent from a PDN GW serving as an anchor point for at least one of PMIP or GTP by employing at least one of a Domain Name Service (DNS) query for a domain name configured based on the home agent or a connection attachment procedure; and receiving information relating to the global address of the home agent from the PDN GW.

According to another aspect, a method for coordinating discovery of a MIP HA is described herein. The method can comprise identifying a mobile terminal managed through one or more of PMIP or GTP; receiving one or more messages from the identified mobile terminal containing respective requests for a global MIP HA address; and transmitting information relating to the global MIP HA address in response to the one or more messages.

A further aspect relates to a wireless communications apparatus that can comprise a memory that stores data relating to an access terminal for which the wireless communications apparatus serves as a PDN GW and an anchor point for a network-based mobility protocol and one or more communications of data received from the access terminal. The wireless communications apparatus can further comprise a processor configured to identify respective requests for a global home agent address from the communications of data received from the access terminal and to communicate an indication of the global home agent address to the access terminal in response to the requests.

Another aspect relates to an apparatus that facilitates MIP HA discovery. The apparatus can comprise means for receiving a request from a user equipment (UE) managed via one or more of PMIP or GTP for a global address corresponding to a MIP HA address for the UE; and means for transmitting information corresponding to the global address of the MIP HA to the UE in response to the request.

Yet another aspect relates to a machine-readable medium having stored thereon instructions which, when executed by a machine, cause the machine to perform operations comprising identifying information comprising one or more of a DNS query, a Router Solicitation message, or an attachment request provided by a terminal managed via at least one of PMIP or GTP; and providing information to the terminal relating to a global address of a home agent for the terminal in response to the identified information.

Still another aspect relates to an integrated circuit that executes computer-executable instructions for facilitating discovery of a home agent at a requesting mobile device. The instructions can comprise identifying a mobile device utilizing at least one of PMIP or GTP for mobility management through an associated wireless communication network; receiving a request for a global home agent address from the mobile device in connection with at least one of a DNS query for a domain name configured based on the home agent or a connection attachment procedure; and relaying information relating to the global home agent address to the mobile device.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
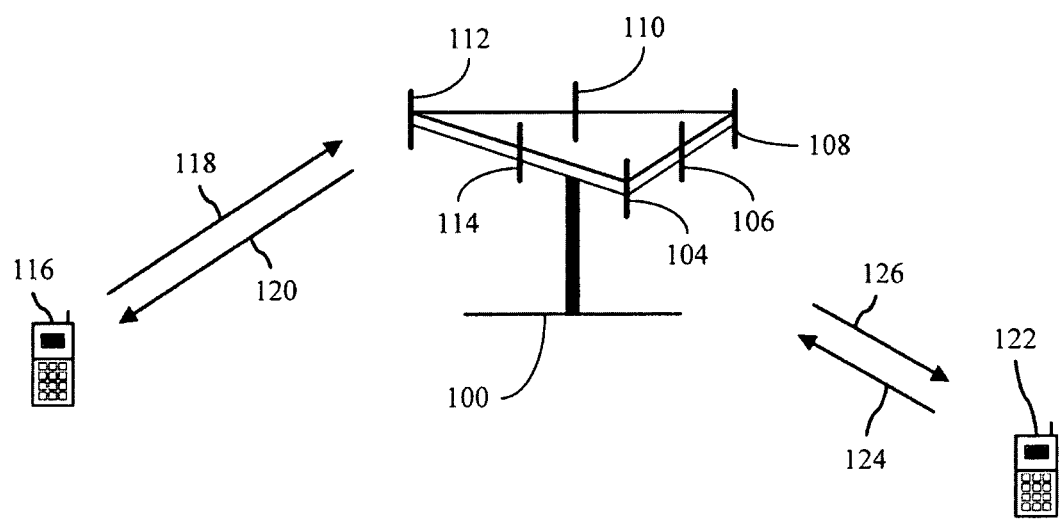
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP)

phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
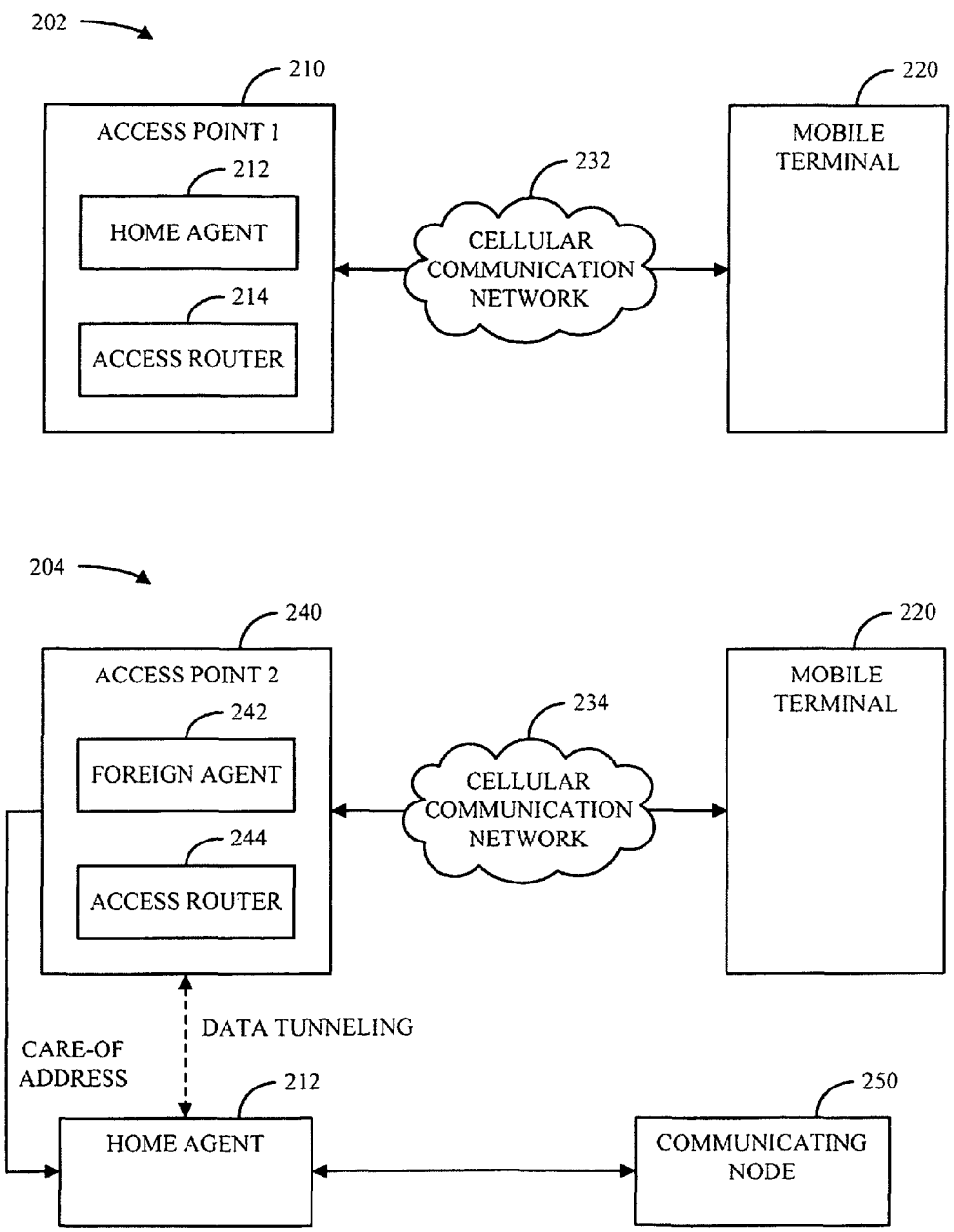
FIG. 2 illustrates mobility of a terminal through a wireless communication system in accordance with various aspects.

FIG. 2 illustrates mobility of a terminal 220 through a wireless communication system in accordance with various aspects. In one example, a first access point 210 and a mobile terminal 220 can initially communicate via a cellular communication network 232 as shown in diagram 202. As diagram 202 illustrates, access point 210 can be and/or include the functionality of a home agent (HA) 212 for Mobile Internet Protocol (Mobile IP or MIP) and/or an access router (AR) 214, which can serve as the anchor point for mobile terminal 220 pursuant to a network-based mobility protocol such as Proxy Mobile IP (PMIP), General Packet Radio Service (GPRS) Tunneling Protocol (GTP) or the like.

In accordance with one aspect, Mobile IP communication functionality can be provided by HA 212 to allow communication of data packets and/or other information to mobile terminal 220 using IP-layer signaling regardless of a present location of mobile terminal 220. In one example, mobile terminal 220 can register with HA 212, thereby obtaining a "home" IP address with HA 212. By doing so, mobile terminal 220 can communicate using IP based on the home address of the mobile terminal 220 regardless of movement of the mobile terminal 220 within network 232 and/or other, disparate networks. In one example, HA 212 can maintain a table of home IP addresses assigned to various terminals and utilize the table to identify an incoming data packet for a specified terminal based on a home address of the terminal.

In accordance with another aspect, in the event that mobile terminal 220 moves outside the coverage of a network served by HA 212, Mobile IP communication can be conducted as illustrated by diagram 204. As diagram 204 illustrates, the mobile terminal 220 can register with a second access point 240 that serves a network to which mobile terminal 220 moves. In one example, access point 240 and mobile terminal 220 can communicate through a cellular communication network 234, which can utilize the same protocol(s) for communication as network 232 and/or different protocol(s). Additionally, in a similar manner to access point 210, access point 240 can be and/or include the functionality of a foreign agent (FA) 242 for Mobile IP and/or an AR 244 that serves as an anchor point for a network-based mobility protocol associated with network 234.

In one example, mobile terminal 220 can register with or otherwise associate with FA 242 to establish a "care-of" address that is utilized while the mobile terminal 220 remains within the coverage of the network served by access point 240. The established care-of address can then be forwarded back to HA 212 in order to facilitate continued communication with mobile terminal 220 using the home address of the mobile terminal 220 as known to HA 212. In another example, information relating to HA 212 can be provided to FA 242 by mobile terminal 220 during and/or after registration with FA 242.

In accordance with one aspect, HA 212 and FA 242 can interact to provide Mobile IP connectivity for a mobile terminal 220 as illustrated in diagram 204. More particularly, a communicating node 250 desiring to transmit information to and/or receive information from mobile terminal 220 can initiate communication with mobile terminal 220 using the home address of the mobile terminal 220. Upon initiating communication, HA 212 can look up the present location of mobile terminal 220. If mobile terminal 220 is presently located within the network associated with HA 212, data can be forwarded between the communicating node 250 and mobile terminal 220 through the network. Alternatively, as illustrated by diagram 204, mobile terminal 220 is located outside the network associated with HA 212, HA 212 can initiate data tunneling to provide information to and/or from an appropriate FA 242 based on the care-of address of mobile terminal 220 provided by mobile terminal 220 and/or FA 242.

As described herein, Mobile IP techniques, such as Mobile IPv4 and Mobile IPv6, provide mobility support based on signaling messages provided by mobile terminal 220 to HA 212. In accordance with one aspect, in order for mobile terminal 220 to communicate appropriate signaling messages to HA 212, mobile terminal 220 is first required to discover the IP address of HA 212 and set up a security association with HA 212 based on the discovered IP address thereof.

However, discovery of the global IP address of HA 212 becomes difficult when Mobile IP is applied to a 3GPP core network or, more generally, any network wherein movements of mobile terminals 220 are managed through a network-based protocol. More particularly, operators of wireless communication networks can impose requirements for HA assignment and discovery that are not met by existing HA discovery techniques. For example, 3GPP networks utilize Access Point Name (APN) for respective wireless access points, which can be utilized by a mobile terminal to indicate a network to which the terminal desires to attach. The concept of APN, however, is not considered in existing HA discovery techniques. Further, existing HA discovery techniques generally do not take into account that a particular mobile terminal can attach to a given network based on any type of access, whether 3GPP or non-3GPP, and that HA discovery should therefore not be based on access-specific capabilities or information.

As an additional example, existing HA discovery techniques do not consider the scenario wherein 3GPP access is considered the home link for Mobile IP for a given terminal, which can be required by a network operator if it is desired to avoid Mobile IP tunneling in connection with 3GPP access. Such a scenario can additionally and/or alternatively arise in the event that an APN used for discovery of a 3GPP AR (e.g., a Gateway GPRS Support Node or GGSN) is the same as an APN used for HA discovery, such as when a HA and AR are collocated. Because movements of a mobile terminal in a 3GPP core network in such a scenario are managed through a network-based protocol (e.g., PMIP or GTP), a mobile terminal does not need to be aware of the gateway that is acting as the anchor point for its location changes while in the 3GPP network. However, if the mobile terminal moves to an access network where network-based mobility is not supported and/or another network where it is desirable to utilize Mobile IP to manage movements, the terminal must then discover the address of the HA that is collocated with the anchor point of the network-based mobility protocol used in the 3GPP network. As a result, a mechanism to match allocation of an anchor point for a network-based mobility protocol and a subsequent Mobile IP HA discovered by a terminal is required in such a scenario.

In view of the above shortcomings of existing HA discovery techniques, various aspects described herein can be utilized to facilitate discovery of a HA for Mobile IP at a mobile terminal located on a network wherein movement of the terminal is managed by a network-based mobility protocol. For example, various aspects described herein can be utilized by a mobile terminal to discover a HA located in a 3GPP network from any access, either 3GPP or non-3GPP. Further, various aspects described herein can be utilized to discover the same gateway that was acting as mobility anchor for a network mobility protocol utilized by the network. In accordance with one aspect, HA discovery can be achieved by a mobile terminal at least in part by identifying an anchor point of a network-based mobility protocol associated with a network in which the terminal is located, communicating one or more messages to the identified anchor point containing respective requests for a Mobile IP HA address, and receiving information relating to the Mobile IP HA address in response to the messages. Further, techniques for HA discovery as described herein can be used in connection with DNS query formation and communication, network attach and/or re-attach procedures, Neighbor Discovery signaling, and/or other appropriate procedures. Example HA discovery techniques that can be performed in accordance with various aspects are described in further detail infra.

Figure 3:
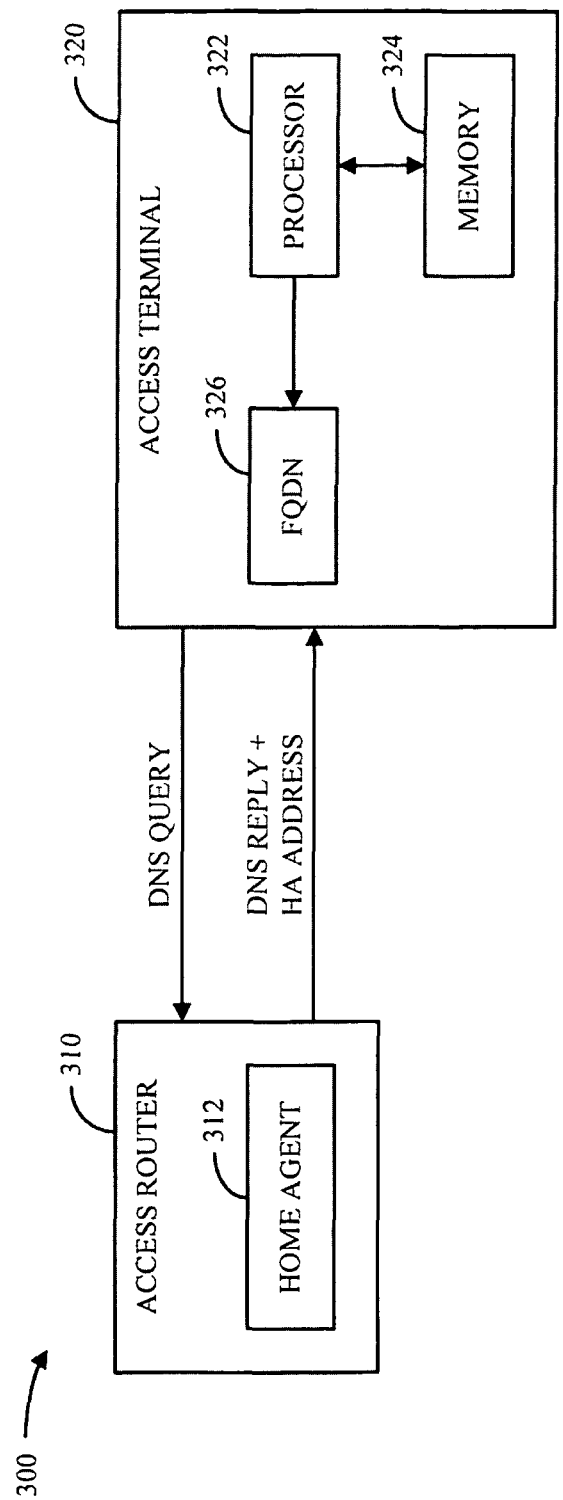
FIGS. 3-6 are block diagrams of respective systems for Mobile IP home agent discovery in a wireless communication network.

FIG. 3 is a block diagram that illustrates an example system 300 for Mobile IP home agent discovery in accordance with various aspects. In one example, system 300 includes an AR 310, which can serve as the anchor point of a network-based mobility protocol for one or more access terminals (ATs) 320. As system 300 illustrates, AR 310 can be and/or otherwise incorporate the functionality of a Mobile IP HA 312 for access terminal 320. It should be appreciated, however, that while system 300 illustrates HA 312 as collocated with AR 310, AR 310 and HA 312 could alternatively be implemented as separate entities in system 300.

In accordance with one aspect, AR 310 can act as a DNS server for one or more DNS queries provided by an AT 320. For example, AT 320 can utilize a processor 322 and/or memory 324 to configure a fully qualified domain name (FQDN) 326 based on a Mobile IP HA 312 for which discovery is desired and to communicate a DNS query based on the configured FQDN 326. In one example, FQDN 326 can be configured by AT 320 based on an Access Point Name (APN) of AR 310 and/or HA 312. Additionally and/or alternatively, FQDN 326 can be configured based on the identity(ies) of AT 320 and/or any other appropriate entities in system 300 as well as an operator of system 300. By way of example, for a terminal with identity A operating in a system operated by Operator X, a configured FQDN 326 can be homeagent.servingA.OperatorX.com. or the like.

Upon communication of a DNS query by AT 320, AR 310 can intercept the DNS query in order to process it. By way of example, if network traffic from AT 320 is routed through AR 310, AR 310 can examine traffic received from AT 320 to identify DNS queries received therefrom. Additionally and/or alternatively, AR 310 can be configured to act as a DNS server for AT 320 such that all DNS queries from AT 320 are directed to and/or processed by AR 310. In accordance with one aspect, AR 310 can be configured with DNS entries corresponding to FQDNs for which itself or another AR associated therewith can act as HA for a requesting AT. Accordingly, if a DNS query received by AR 310 contains a FQDN for which a corresponding DNS entry at AR 310 exists, AR 310 can reply to the DNS query with an appropriate HA address, thereby acting as the authoritative name server for said FQDN. For example, if a DNS query is received from AT 320 for a FQDN 326 corresponding to a HA 312 collocated with AR 310, AR 310 can reply to the DNS query with its own IP address. Alternatively, if AR 310 receives a DNS query from AT 320 for a FQDN 326 corresponding to another AR that can serve as HA for AT 320, AR 310 can reply to the DNS query with an IP address of the AR corresponding to the FQDN 326.

In accordance with one aspect, the role of AR 310 can vary based on communication protocol(s) utilized by system 300. For example, AR 310 can be a Packet Data Network Gateway (PDN GW) in 3GPP System Architecture Evolution (SAE), a GGSN in UMTS and/or GPRS, a Packet Data Gateway (PDG) in an Interworked Wireless Local Area Network (I-WLAN), and/or any other suitable network entity.

Figure 4:
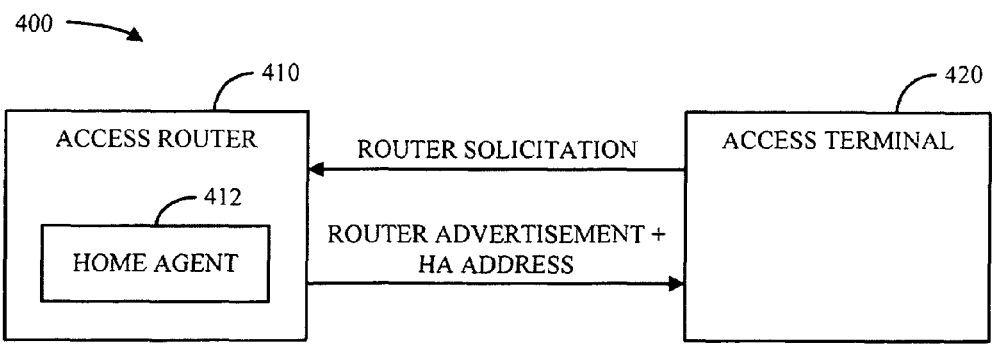

FIG. 4 is a block diagram that illustrates another example system 400 for Mobile IP home agent discovery in accordance with various aspects. In one example, system 400 includes an AR 410, which can serve as the anchor point of a network-based mobility protocol for one or more ATs 420. Further, AR 410 can be configured to be the default gateway of AT 420. Accordingly, a Mobile IP HA 412 can be collocated with AR 410 such that AT 420 is configured to select AR 410 as its HA 412.

In accordance with one aspect, if a network-based mobility protocol (e.g., GTP or another suitable protocol) is utilized to manage ATs 420 in system 400, an AT 420 generally is not provided with knowledge of the IP address of an AR 410 that serves as its default gateway. Accordingly, in order to discover the IP address of HA 412, AT 420 can utilize one or more procedures for identifying the IP address of an AR 410 serving as its default gateway at which a HA 412 is collocated. In one example, HA discovery can be carried out by AT 420 through Neighbor Discovery signaling. For example, as system 400 illustrates, AT 420 can communicate a Router Solicitation message to AR 410. In return, AR 410, acting as HA 412 for AT 420, can reply to the Router Solicitation message with a Router Advertisement message that includes the global IP address of AR 410. In a system where a HA 412 is collocated with AR 410, AT can then utilize the IP address of AR 410 obtained through the Router Advertisement message as its HA address.

Figure 5:
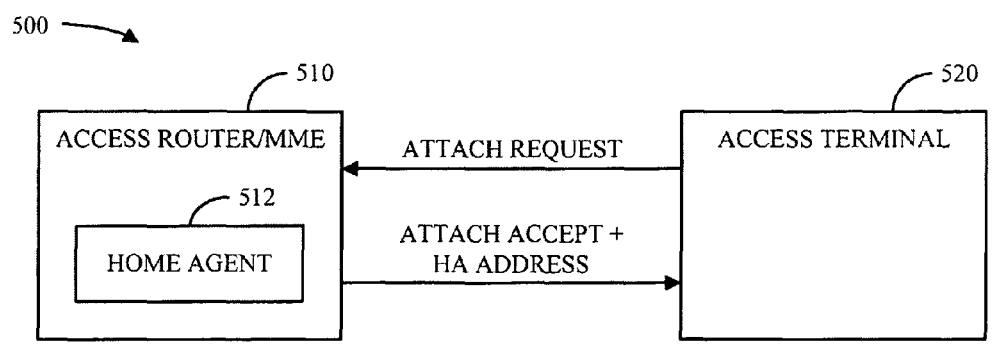

FIG. 5 is a block diagram that illustrates an additional example system 400 for Mobile IP home agent discovery in accordance with various aspects. In one example, system 500 includes an AR 510, which can serve as the anchor point of a network-based mobility protocol for one or more ATs 520. In accordance with one aspect, AR 510 and AT 520 can communicate within system 500 based on 3GPP access. For example, as system 500 illustrates, AR 510 and AT 520 can utilize a LTE attach procedure to establish a communication link therebetween. By way of example, an LTE attach procedure can be initiated by AT 520 by communicating an attach request message to AR 510. In response to an attach request message, AR 510 can provide an attach accept message to AT 520. In accordance with one aspect, an attach accept message provided to AT 520 by AR 510 can include the IP address of a HA 512 for the AT 520. The IP address of HA 512 can be can be provided in any suitable portion of the attach accept message, such as in a protocol configuration option carried by the attach accept message and/or in any other portion of the attach accept message. Alternatively, the IP address of HA 512 can be provided by AR 510 or a Mobility Management Entity (MME) in a message that is disparate from the attach accept message. Additionally, it should be appreciated that while system 500 illustrates an example HA 512 collocated with AR 510, HA 512 can alternatively be a stand-alone entity or collocated with another network entity.

Figure 6:
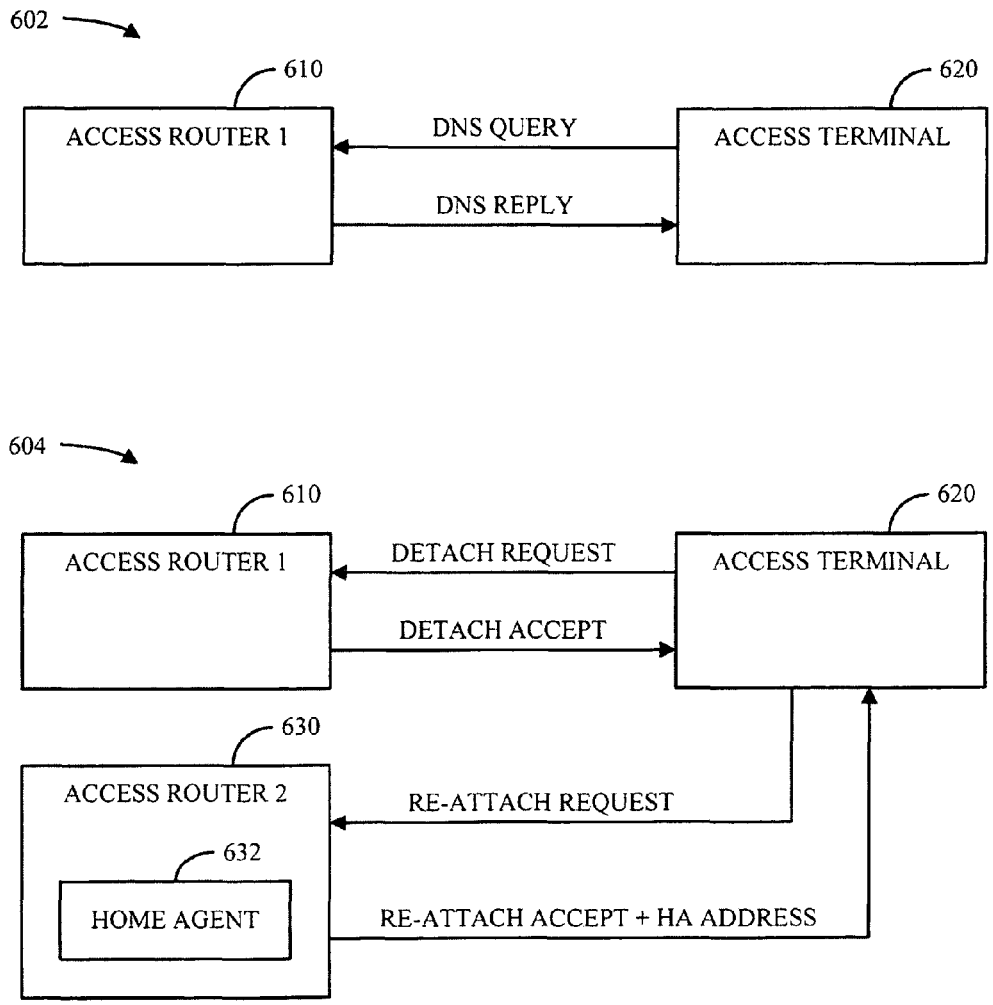

FIG. 6 is a block diagram that illustrates a further system 600 for Mobile IP HA discovery in accordance with various aspects. In one example, HA discovery can begin as illustrated in diagram 602 between an AT 620 and a first AR 610 that is assigned to the AT 620 as the anchor point of a network-based mobility protocol. As diagram 602 further illustrates, AT 620 can conduct DNS-based HA discovery by submitting a DNS query to AR 610. In one example, the DNS query submitted by AT 620 can be based on an APN and/or FQDN for a HA to be discovered, which can be configured in a substantially similar manner to that described supra with respect to system 300. Additionally and/or alternatively, a DNS query provided by AT 620 can be received and/or processed by AR 610 in a similar manner to that described supra with respect to AR 310.

In accordance with one aspect, AR 610 can provide a DNS reply to AT 620 that indicates the global address of a HA for the AT. In one example, the DNS reply can provide the global IP address of the HA, either by including the global IP address of AR 610 if the HA is collocated with AR 610 or by providing the global IP address of another AR or other network entity at which the HA is collocated. Alternatively, AR 610 can additionally provide a link-local address for an entity with which the HA is collocated if the HA is not collocated with AR 610.

In accordance with another aspect, if a DNS reply received from AR 610 indicates that a HA for AT 620 is located at a different network node than AR 610, AT 620 can subsequently associate with the HA as illustrated in diagram 604. For example, as diagram 604 illustrates, a HA 632 designated for AT 620 is collocated with a second AR 630 that is disparate from the first AR 610. Accordingly, to associate with HA 632, AT 620 can de-attach from AR 610 by exchanging de-attach signaling with AR 610 as illustrated by diagram 604. Subsequently, AT 620 can re-attach to AR 630 and HA 632 by exchanging re-attach signaling with AR 630. In accordance with one aspect, re-attach messages can be communicated between AR 630 and AT 620 pursuant to a LTE re-attach procedure and/or another appropriate procedure.

In one example, the global IP address of HA 632 can be provided to AT 620 prior to re-attachment with AR 630. Alternatively, the global IP address of HA 632 can be provided to AT 620 upon re-attachment with AR 630. For example, the address of HA 632 can be stored on an Authentication Authorization Accounting Home Subscriber Server (AAA/HSS) associated with AR 630, retrieved during the re-attach procedure between AR 630 and AT 620, and assigned to AT 620 following re-attachment. In accordance with one aspect, an assignment of HA 632 to AT 620 can be made in a re-attach accept message communicated to AT 620 and/or in a separate message, such as a DNS message provided to AT 620 using IP-layer signaling and/or another suitable network-dependent or network-independent technique.

Referring to FIGS. 7-14, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
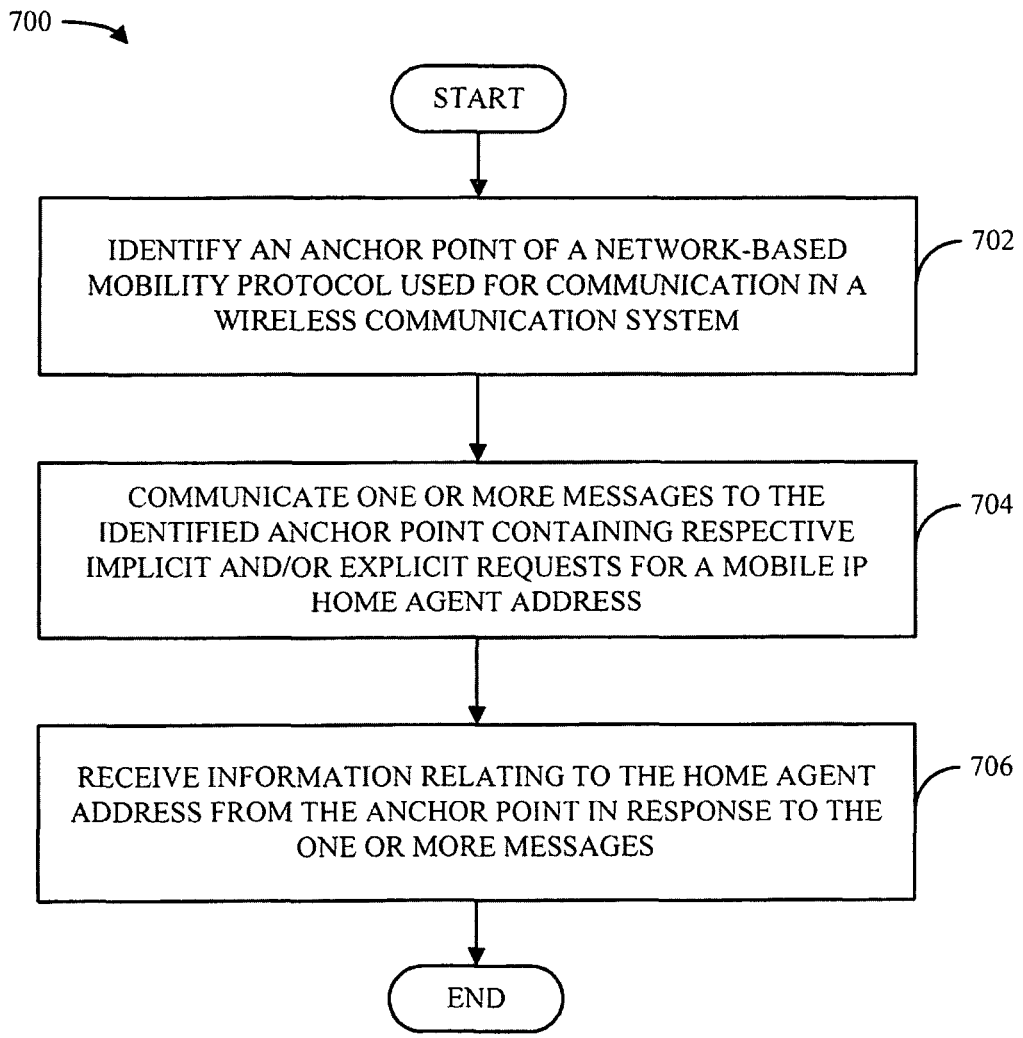
FIGS. 7-10 are flow diagrams of respective methodologies for identifying a Mobile IP home agent in a wireless communication network.

With reference to FIG. 7, illustrated is a methodology 700 for identifying a Mobile IP home agent in a wireless communication system (e.g., system 200). It is to be appreciated that methodology 700 can be performed by, for example, a mobile device (e.g., mobile terminal 220) and/or any other appropriate network entity. Methodology 700 begins at block 702, wherein an anchor point (e.g., AR 214 and/or AP 210) of a network-based mobility protocol (e.g., GTP and/or PMIP) used for communication in a wireless communication system is identified. An anchor point identified at block 702 can be a serving anchor point for an entity performing methodology 700, or alternatively the identified anchor point can be located in a network to which the entity performing methodology 700 is connecting. Further, the anchor point identified at block 702 can be a PDN GW and/or any other suitable network entity.

Next, at block 704, one or more messages are communicated to the anchor point identified at block 702 that contain respective implicit and/or explicit requests for a Mobile IP home agent address. Messages communicated at block 704 can be based on, for example, DNS signaling, an LTE attachment and/or re-attachment procedure, Neighbor Discovery signaling, and/or any other suitable type of communication. Methodology 700 can then conclude at block 706, wherein information relating to the Mobile IP home agent address is received from the anchor point identified at block 702 in response to the messages communicated at block 704. In accordance with one aspect, information received at block 706 can include the Mobile IP home agent address itself and/or other information to further facilitate its discovery. For example, information received at block 706 can include a local address of a second anchor point at which a home agent is collocated in order to facilitate a subsequent connection to the second anchor point.

Figure 8:
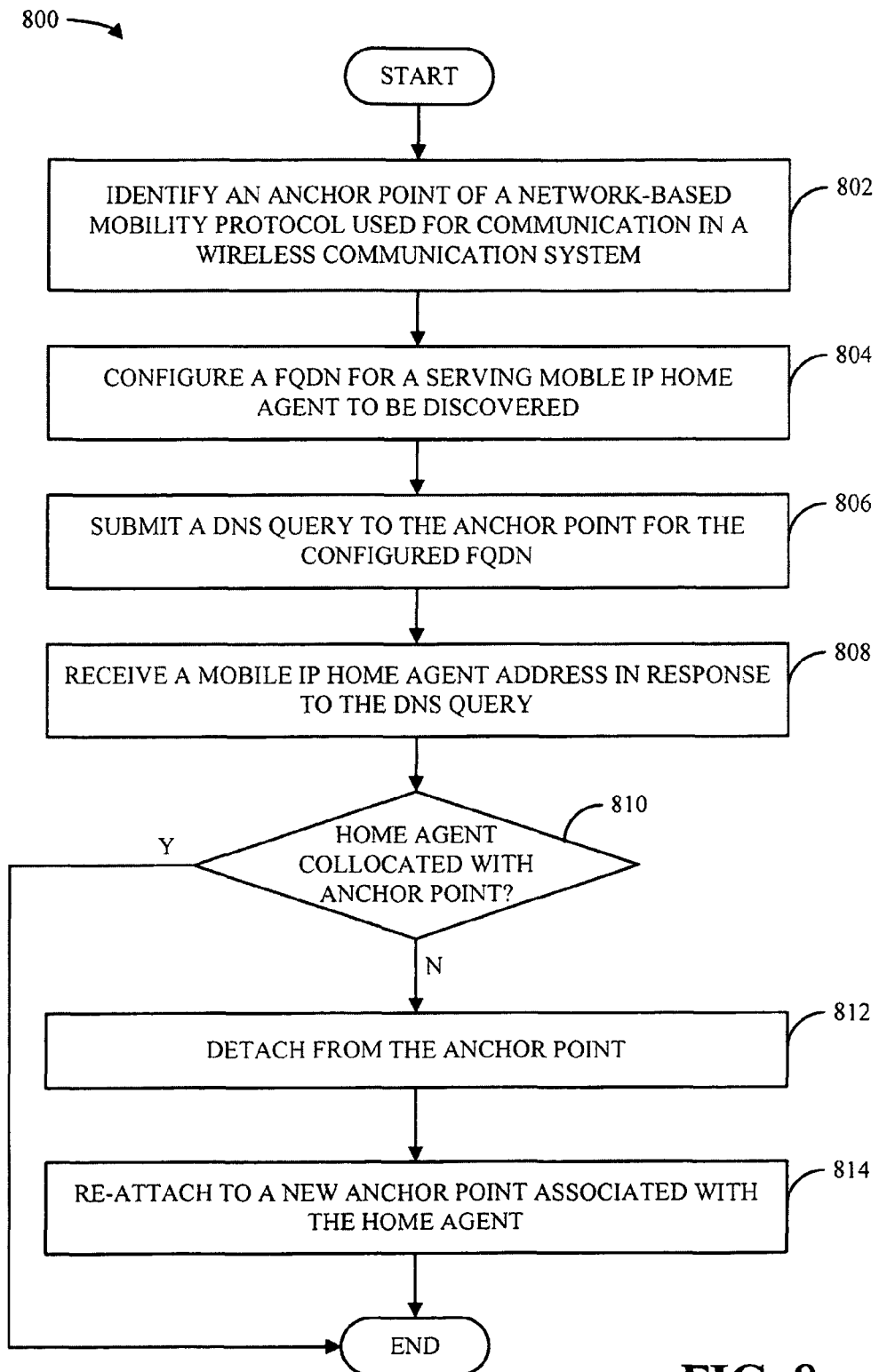

FIG. 8 illustrates a methodology 800 for identifying a Mobile IP home agent based on DNS signaling. Methodology 800 can be performed by a mobile terminal and/or any other suitable network entity. Methodology 800 begins at block 802, wherein an anchor point of a network-based mobility protocol used for communication in a wireless communication system is identified. Next, at block 804, a FQDN for a serving Mobile IP home agent to be discovered is configured. A FQDN for the home agent can be configured at block 804 based on an APN associated with the home agent, an identity of the entity performing methodology 800, an identity of the anchor point identified at block 802, an operator of the wireless communication system, and/or other suitable factors. At block 806, a DNS query is then submitted to the anchor point identified at block 802 for the FQDN identified at block 804.

Methodology 800 then proceeds to block 808, wherein a Mobile IP home agent address is received in response to the DNS query submitted at block 806. In accordance with one aspect, an address received at block 808 can be a global address (e.g., an IP address) of the home agent or a local address to another entity in the wireless communication system with which the home agent is collocated. Next at block 810, it is determined based on the address received at block 808 whether the home agent is collocated with the anchor point identified at block 802. If the home agent is collocated with the anchor point, then it can be inferred that the address received at block 808 is the global address of the home agent and methodology 800 concludes. Otherwise, methodology 800 proceeds to block 812, wherein the entity performing methodology 800 detaches from the anchor point identified at block 802. Detachment at block 812 can be performed using, for example, an exchange of detachment signaling messages and/or other suitable means. Methodology 800 can then conclude at block 814, wherein re-attachment to a new anchor point associated with the home agent corresponding to the address received at block 808 is conducted. Re-attachment at block 808 can be performed by using, for example, an LTE re-attach procedure involving the exchange of re-attachment messages and/or other appropriate means. In accordance with one aspect, a re-attach message received from the new anchor point at block 814 can include and/or otherwise indicate a global home agent address. Additionally and/or alternatively, a global home agent address can be received from the anchor point or an associated MME in a separate message upon re-attachment at block 814.

Figure 9:
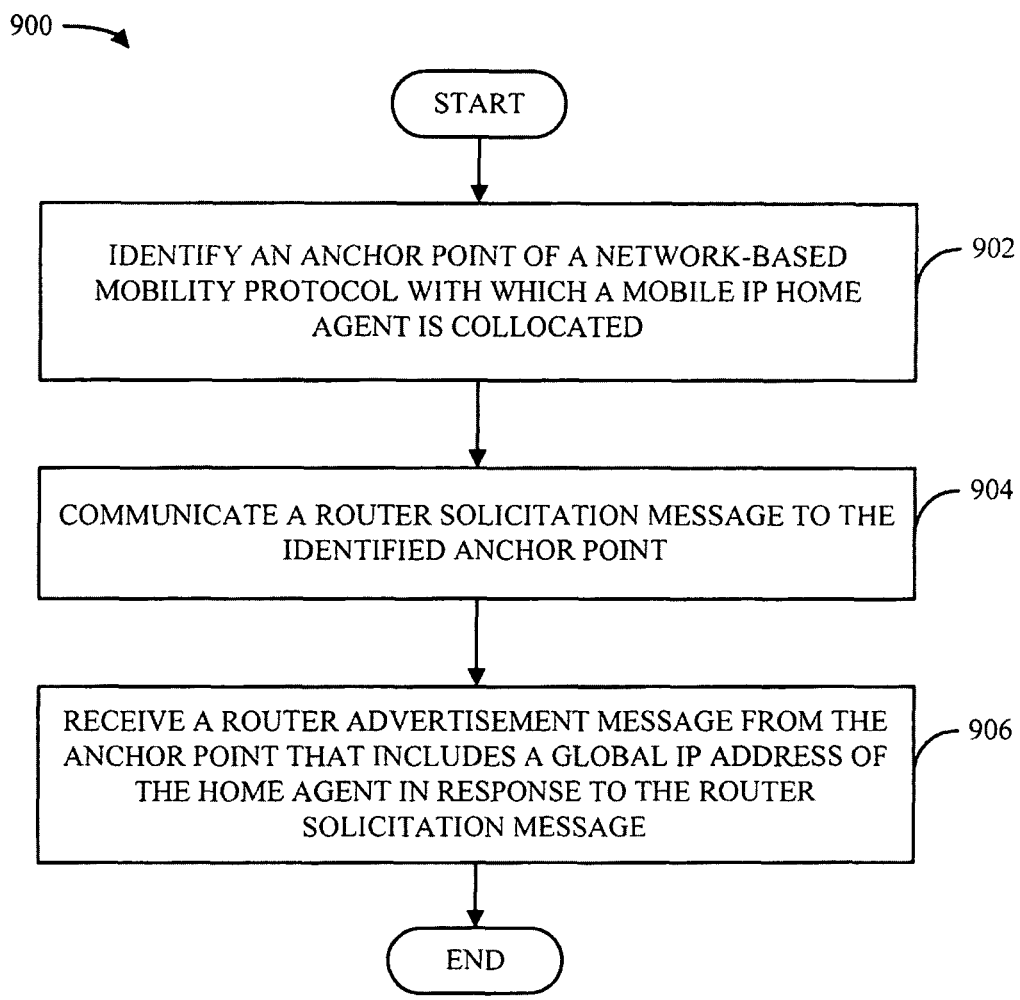

FIG. 9 illustrates a methodology 900 for identifying a Mobile IP home agent based on Neighbor Discovery signaling. It should be appreciated that methodology 900 can be performed by, for example, an access terminal and/or any other appropriate network entity. Methodology 900 begins at block 902, wherein an anchor point of a network-based mobility protocol with which a Mobile IP home agent is collocated is identified. Next, at block 904, a Router Solicitation message is communicated to the anchor point identified at block 902. Methodology 900 can then conclude at block 906, wherein a Router Advertisement message is received from the anchor point identified at block 902 that includes a global IP address of the home agent collocated therewith in response to the Router Solicitation message communicated at block 904.

Figure 10:
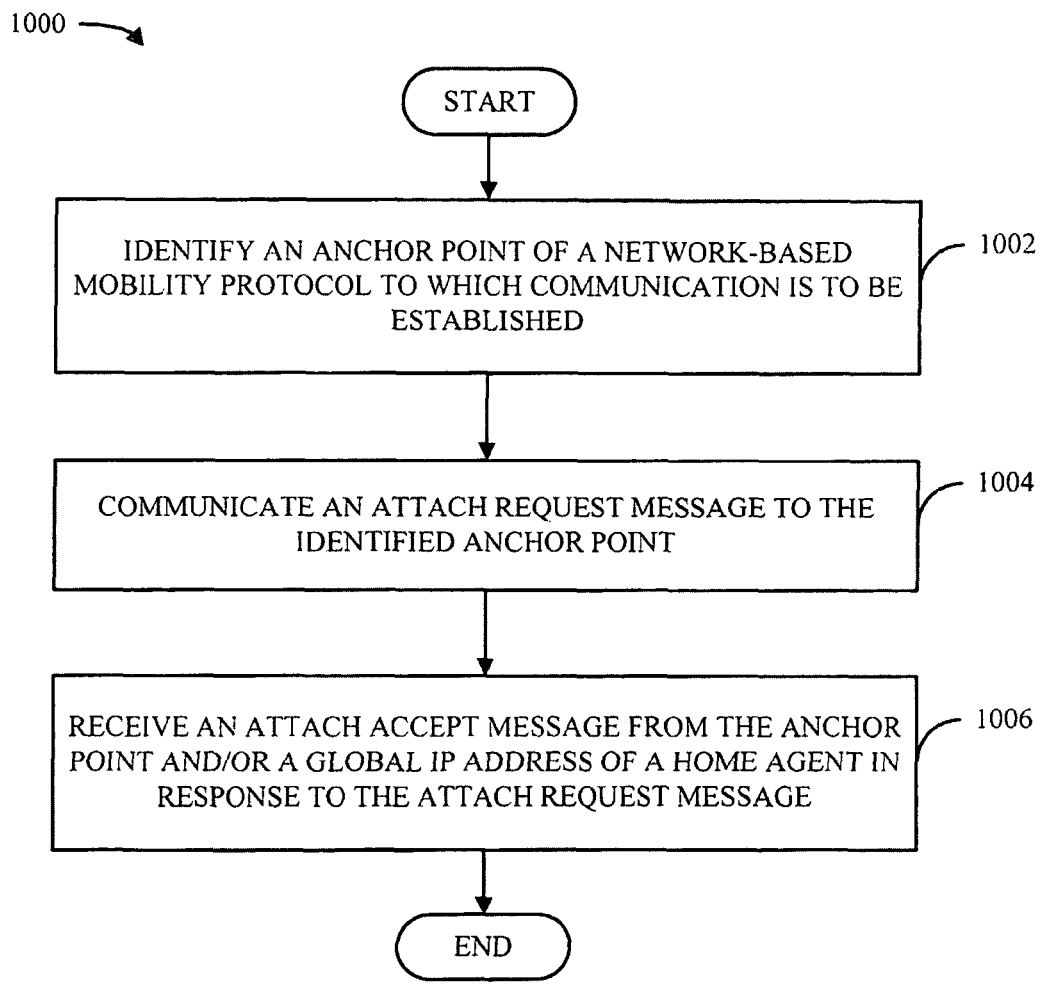

FIG. 10 is a flow diagram that illustrates a methodology 1000 for identifying a Mobile IP home agent based on a network attachment procedure. Methodology 1000 can be performed by a mobile device and/or any other suitable network entity. Methodology 1000 begins at block 1002, wherein an anchor point of a network-based mobility protocol to which communication is to be established is identified. Methodology 1000 can then proceed to block 1004, wherein an attach request message is communicated to the anchor point identified at block 1002. Methodology 1000 can then conclude at block 1006, wherein an attach accept message and/or a global IP address of a home agent are received from the anchor point identified at block 1002 in response to the attach request message communicated to the anchor point at block 1004. In accordance with one aspect, the global IP address received at block 1006 can be received from the anchor point identified at 1002 and/or a MME associated with the anchor point. In addition, the global IP address can be received as part of the attach accept message (e.g., in a protocol configuration option carried by the attach accept message) or separately from the attach accept message.

Figure 11:
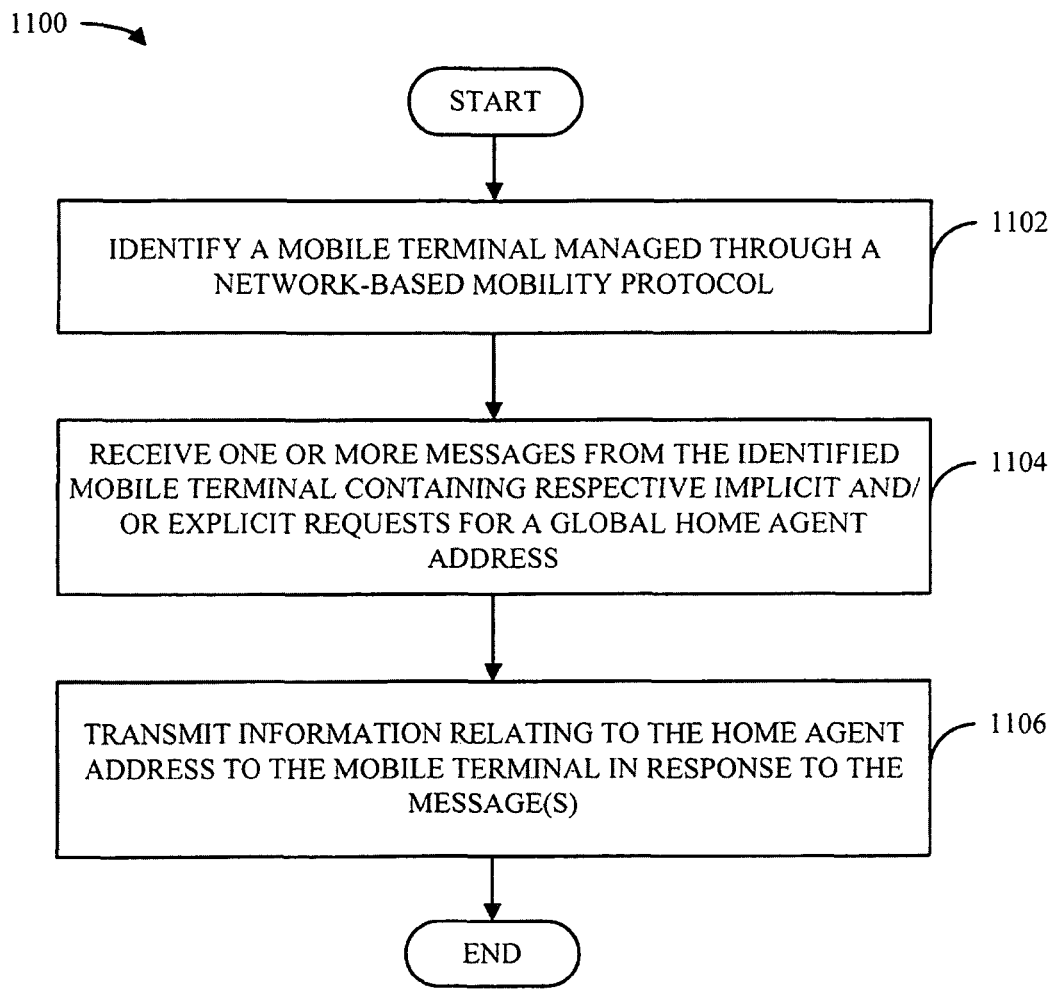
FIGS. 11-14 are flow diagrams of facilitating discovery of a home agent at a mobile terminal.

With reference to FIG. 11, illustrated is a methodology 1100 for facilitating discovery of a home agent at a mobile terminal (e.g., an AT 220 in system 200). It is to be appreciated that methodology 1100 can be performed by, for example, a wireless access point and/or access router (e.g., AP 210 and/or AR 214) and/or any other appropriate network entity. By way of further specific, non-limiting example, an entity performing methodology 1100 can serve as a PDN GW for one or more mobile terminals. Methodology 1100 begins at block 1102, wherein a mobile terminal managed through a network-based mobility protocol (e.g., PMIP and/or GTP) is identified. In accordance with one aspect, a terminal identified at block 1102 can be a terminal for which a communication link has previously been established or a terminal for which a communication link is to be established. For example, a terminal can be identified at block 1102 by receiving a request from the terminal for establishment of a communication link.

Next, at block 1104, one or more messages are received from the mobile terminal identified at block 1102 that contain respective implicit and/or explicit requests for a global home agent address. Messages received at block 1104 can be based on, for example, DNS signaling, an LTE attachment and/or re-attachment procedure, Neighbor Discovery signaling, and/or any other suitable type of communication. Methodology 1100 can then proceed to block 1106, wherein information relating to the home agent address is transmitted to the mobile terminal identified at block 1102 in response to the message(s) received at block 1104. In accordance with one aspect, information transmitted at block 1106 can include the home agent address itself and/or other information relating to an entity at which the home agent is collocated. For example, information received at block 1106 can include a local address of an anchor point at which the home agent is collocated to facilitate a subsequent connection between the terminal identified at block 1102 and the anchor point.

Figure 12:
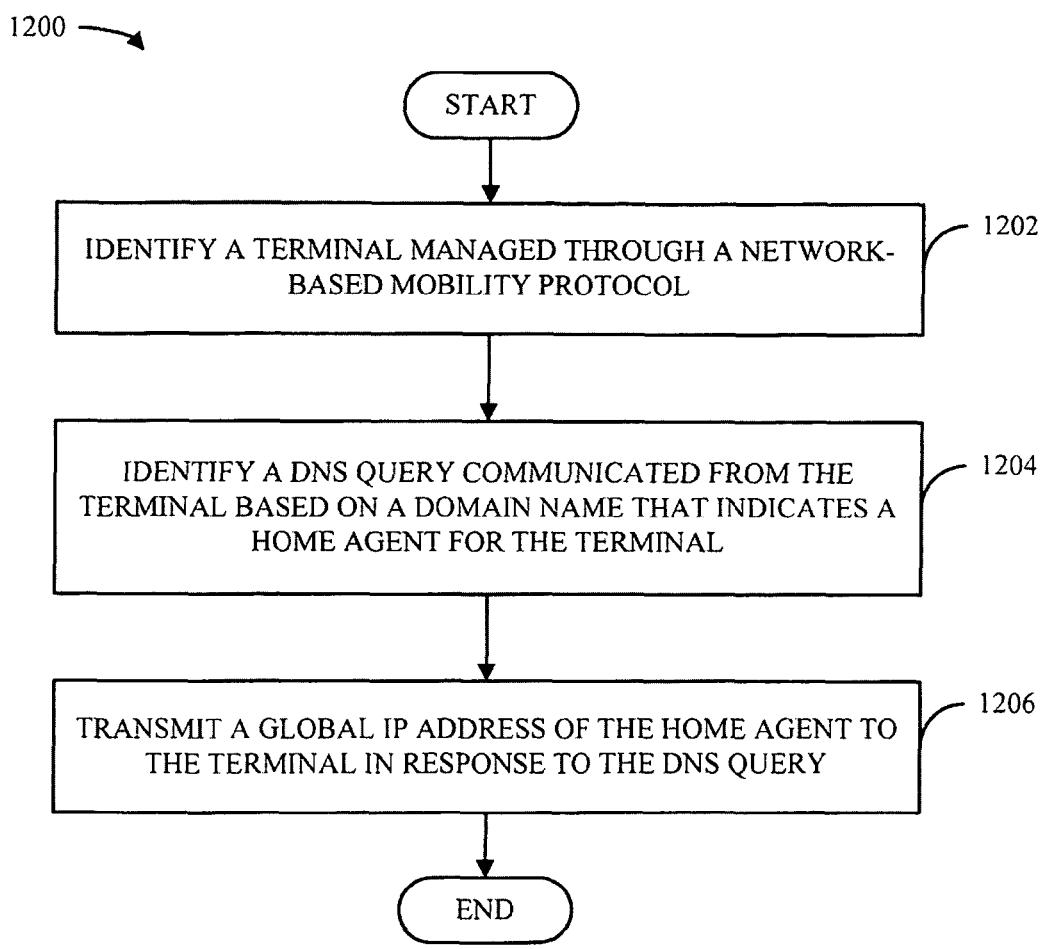

FIG. 12 illustrates a methodology 1200 for facilitating discovery of a home agent based on DNS signaling. Methodology 1200 can be performed by, for example, a wireless access point, an access router, and/or any other appropriate network entity. Methodology 1200 begins at block 1202, wherein a terminal managed through a network-based mobility protocol is identified. Next, at block 1204, a DNS query communicated from the terminal identified at block 1202 that is based on a domain name that indicates a home agent for the terminal is identified. The domain name on which the DNS query identified at block 1204 is based can be configured based on an APN associated with the home agent, an identity of the terminal identified at block 1202, an operator of the wireless communication system, and/or other suitable factors. Further, the DNS query can be identified at block 1204 by intercepting some or all DNS queries from the terminal identified at block 1202 and determining whether respective DNS queries relate to a domain name configured for a home agent. Methodology 1200 can then conclude at block 1206, wherein a global IP address of the home agent is transmitted to the terminal identified at block 1202 in response to the DNS query identified at block 1204.

Figure 13:
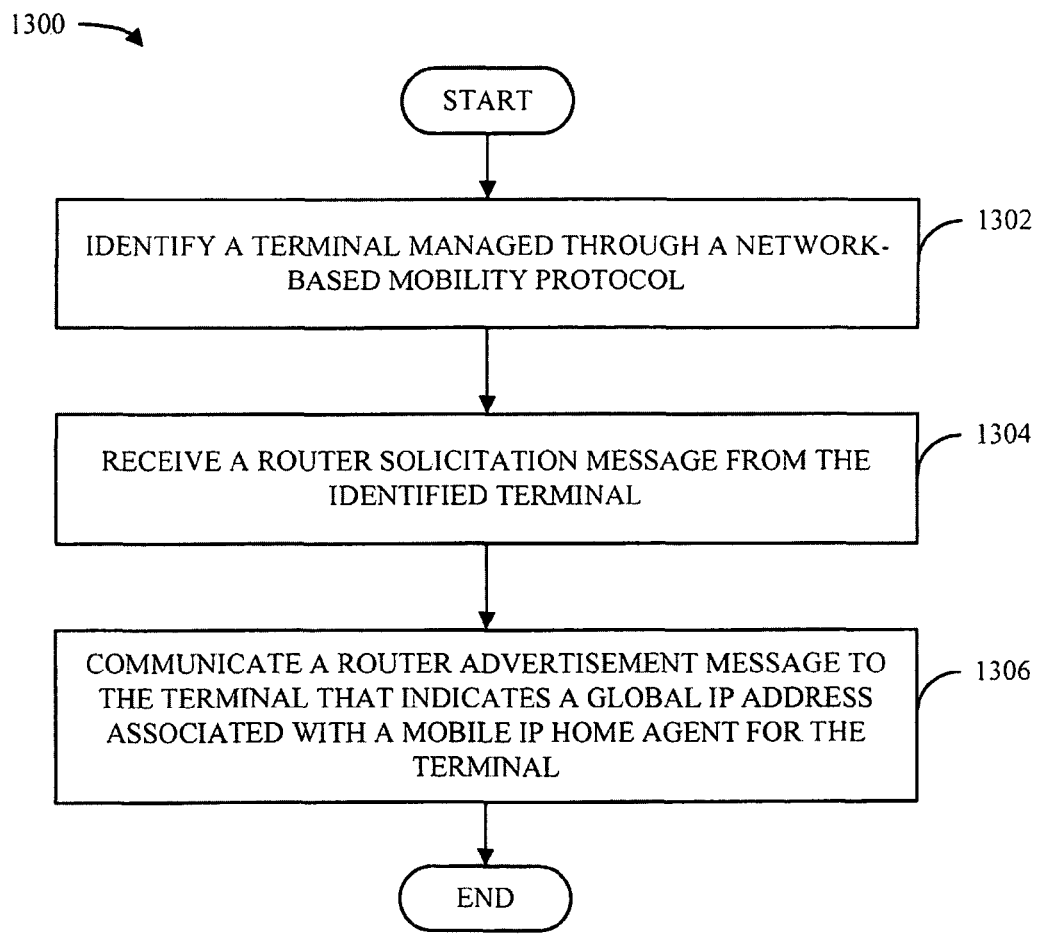

FIG. 13 relates to a methodology 1300 for facilitating discovery of a home agent based on Neighbor Discovery signaling. Methodology 1300 can be performed by, for example, a wireless access point, an access router, and/or any other appropriate network entity. Methodology 1300 begins at block 1302, wherein a terminal managed through a network-based mobility protocol is identified. Next, at block 1304, a Router Solicitation message is received from the terminal identified at block 1302. Methodology 1300 can then continue to block 1306, wherein a Router Advertisement message is transmitted to the terminal identified at block 1302 that indicates a global IP address associated with a Mobile IP home agent for the terminal.

Figure 14:
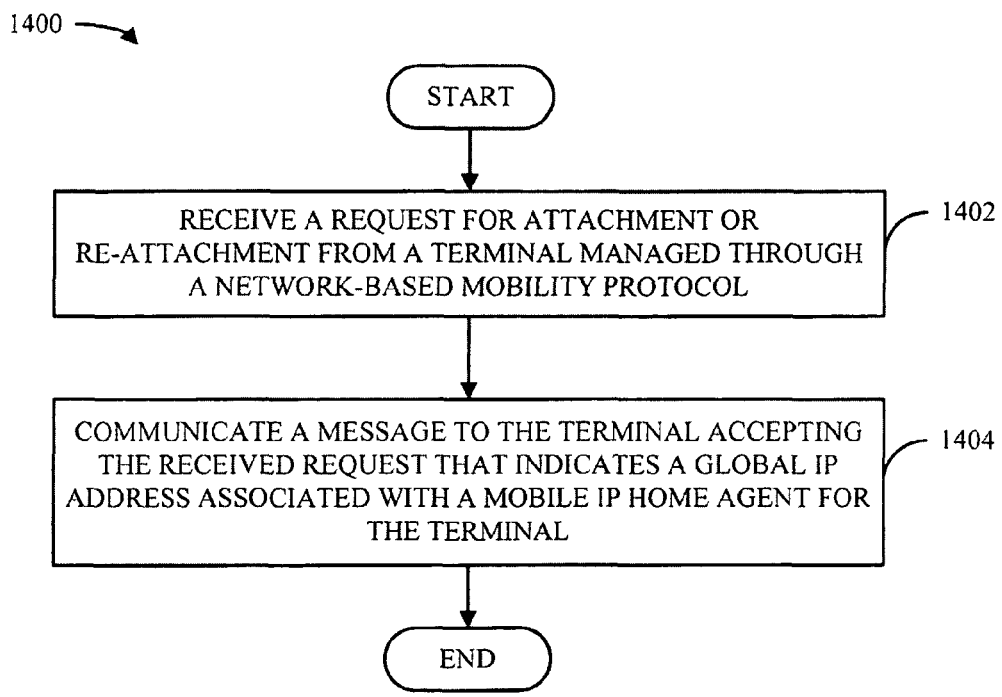

FIG. 14 illustrates a methodology 1400 for facilitating discovery of a home agent based on an attachment and/or re-attachment procedure. Methodology 1400 can be performed by, for example, a wireless access point, an access router, and/or any other appropriate network entity. Methodology 1400 begins at block 1402, wherein a request for attachment or re-attachment is received from a terminal managed through a network-based mobility protocol. Methodology 1400 can then proceed to block 1404, wherein a message is communicated to the terminal accepting the request received at block 1402 that indicates a global IP address associated with a Mobile IP home agent for the terminal. In a specific, non-limiting example, the message communicated at block 1404 can be an attach accept message, and the global IP address associated with the Mobile IP home agent for the terminal can be provided in a protocol configuration option in the attach accept message.

Figure 15:
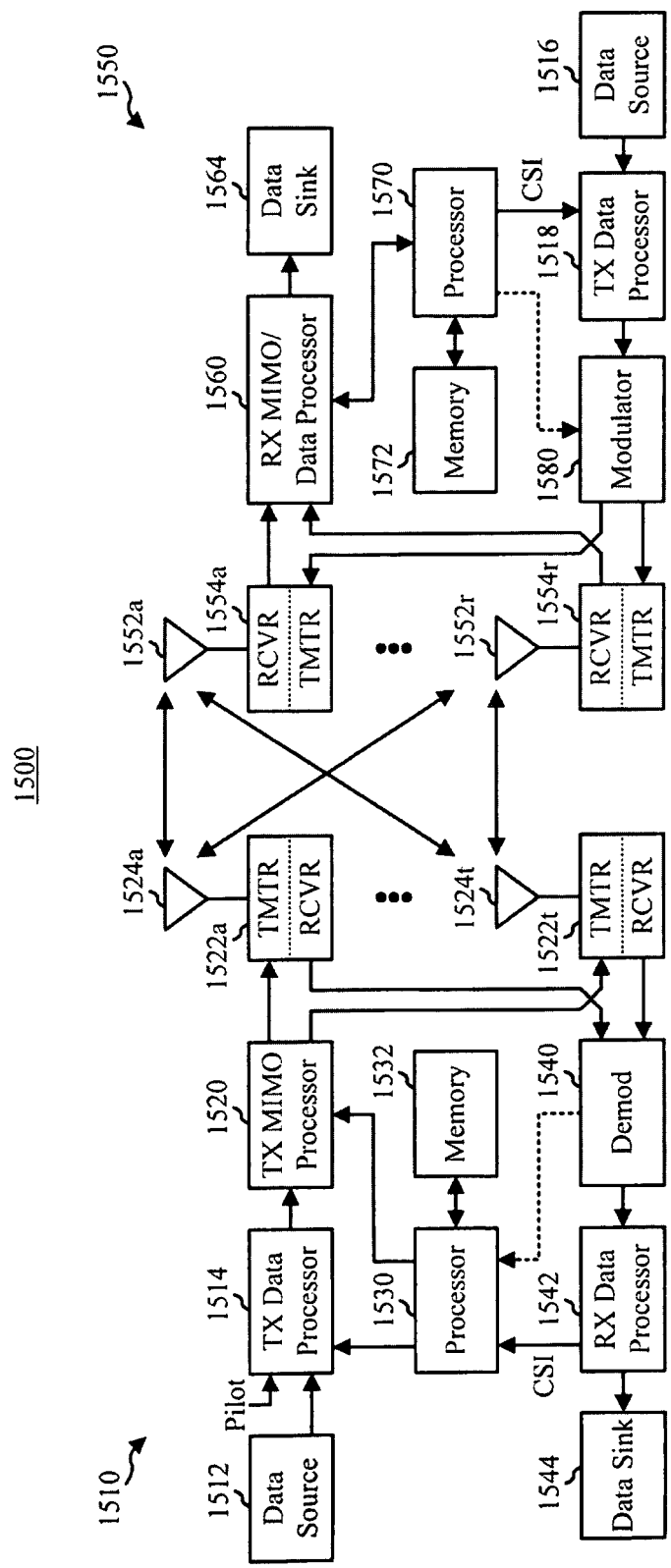
FIG. 15 is a block diagram illustrating an example wireless communication system in which various aspects described herein can function.

Referring now to FIG. 15, a block diagram illustrating an example wireless communication system 1500 in which one or more embodiments described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the AIR received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1514 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 16:
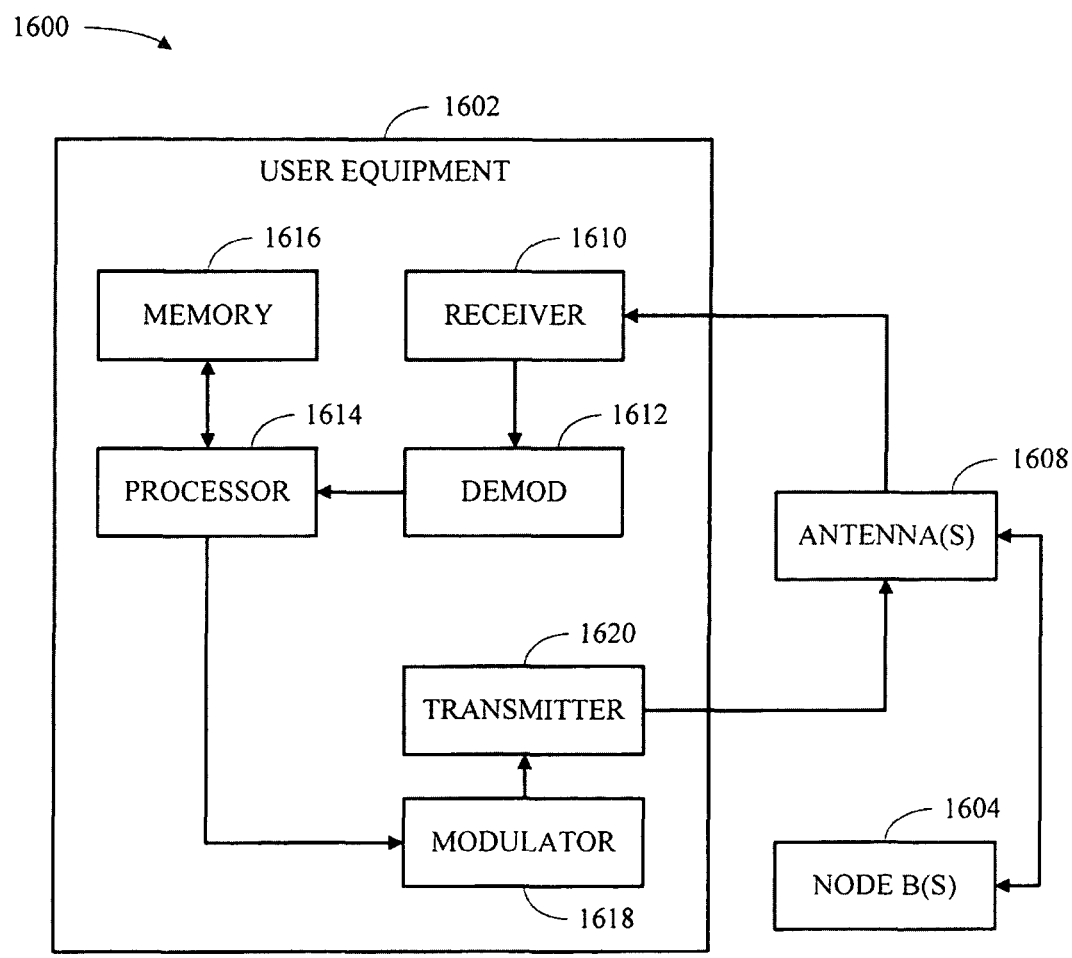
FIG. 16 is a block diagram of a system that coordinates discovery of a home agent in accordance with various aspects.

FIG. 16 is a block diagram of a system that coordinates discovery of a home agent in accordance with various aspects described herein. In one example, system 1600 includes a terminal or user equipment (UE) 1602. As illustrated, UE 1602 can receive signal(s) from one or more Node Bs 1604 and transmit to the one or more Node Bs 1604 via one or more antennas 1608. Additionally, UE 1602 can comprise a receiver 1610 that receives information from antenna(s) 1608. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to UE 1602. Additionally, UE 1602 can employ processor 1614 to perform methodologies 700, 800, 900, 1000, and/or other similar and appropriate methodologies. UE 1602 can also include a modulator 1618 that can multiplex a signal for transmission by a transmitter 1620 through antenna(s) 1608.

Figure 17:
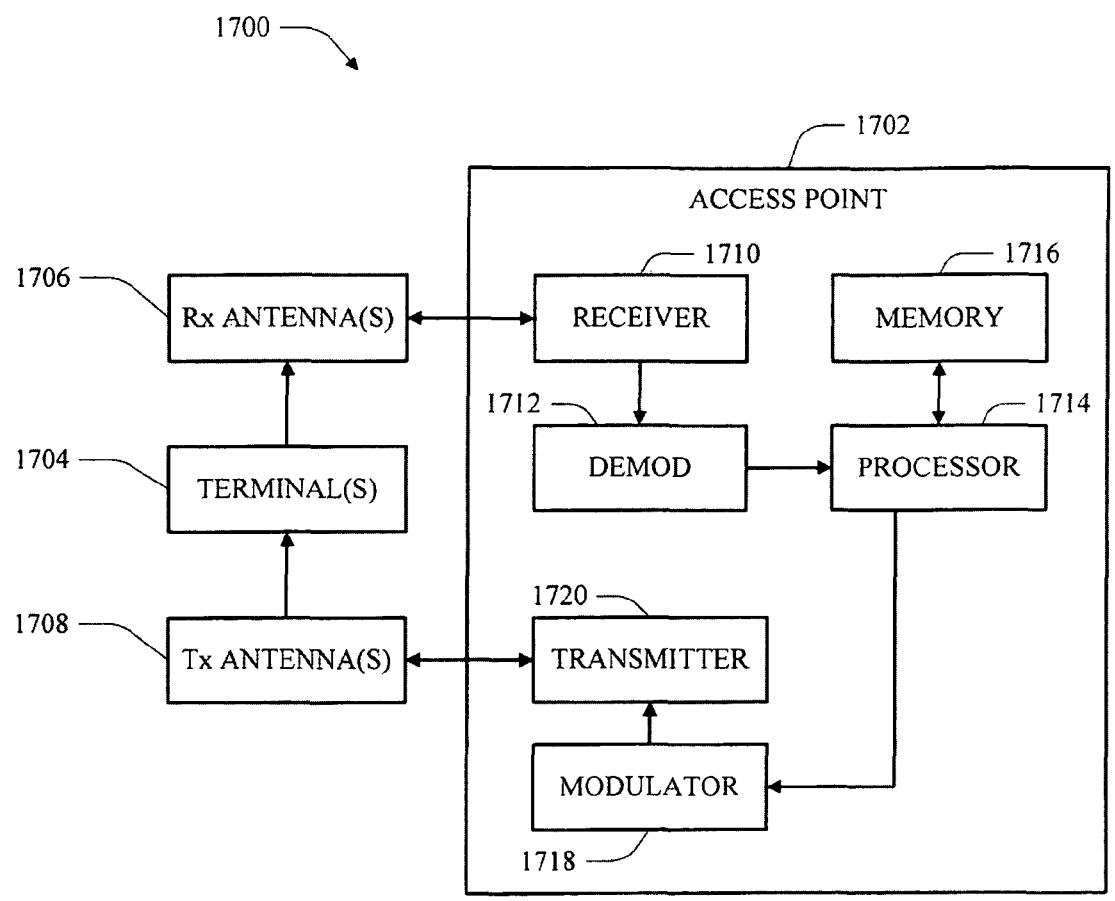
FIG. 17 is a block diagram of a system that provides information relating to a home agent to one or more terminals in accordance with various aspects.

FIG. 17 is a block diagram of a system that provides information relating to a home agent to one or more terminals in accordance with various aspects described herein. In one example, system 1700 includes a base station or access point 1702. As illustrated, access point 1702 can receive signal(s) from one or more access terminals 1704 and/or an access gateway (not shown) via one or more receive (Rx) antennas 1706 and transmit to the one or more access terminals 1004 and/or the access gateway via one or more transmit (Tx) antennas 1708.

Additionally, access point 1702 can comprise a receiver 1710 that receives information from receive antenna(s) 1706. In one example, the receiver 1710 can be operatively associated with a demodulator (Demod) 1712 that demodulates received information. Demodulated symbols can then be analyzed by a processor 1714. Processor 1714 can be coupled to memory 1716, which can store information related to code clusters, access terminal assignments, lookup tables related thereto, unique scrambling sequences, and/or other suitable types of information. In one example, access point 1702 can employ processor 1714 to perform methodologies 1100, 1200, 1300, 1400, and/or other similar and appropriate methodologies. Access point 1702 can also include a modulator 1718 that can multiplex a signal for transmission by a transmitter 1720 through transmit antenna(s) 1708.

Figure 18:
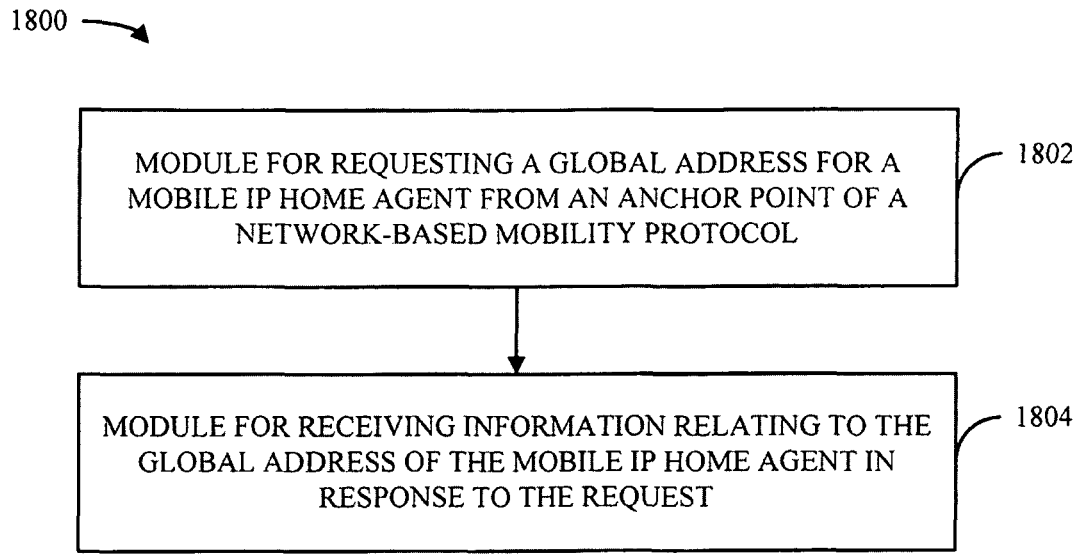
FIGS. 18-19 are block diagrams of respective apparatus that facilitate Mobile IP home agent discovery in a wireless communication system.

FIG. 18 illustrates an apparatus 1800 that facilitates Mobile IP home agent discovery in a wireless communication system (e.g., system 200). It is to be appreciated that apparatus 1800 is represented as including functional blocks, which can be functional blocks that represent functions implemented by a processor, software, or combination thereof (e.g., firmware). Apparatus 1800 can be implemented in a UE (e.g., mobile terminal 220) and/or any other appropriate network entity and can include a module 1802 for requesting a global address for a Mobile IP home agent from an anchor point of a network-based mobility protocol and a module 1804 for receiving information relating to the global address of the Mobile IP home agent in response to the request.

Figure 19:
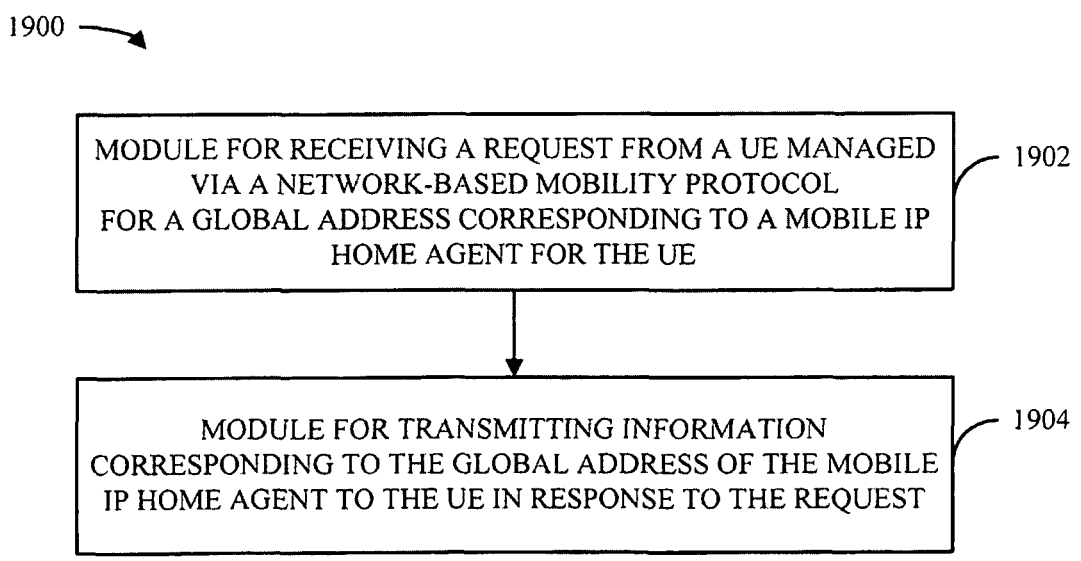

FIG. 19 illustrates another apparatus 1900 that facilitates Mobile IP home agent discovery in a wireless communication system (e.g., system 200). It is to be appreciated that apparatus 1900 is represented as including functional blocks, which can be functional blocks that represent functions implemented by a processor, software, or combination thereof (e.g., firmware). Apparatus 1900 can be implemented in an access point (e.g., access point 210), an access router (e.g., access router 214), and/or any other appropriate network entity and can include a module 1902 for receiving a request from a UE managed via a network-based mobility protocol for a global address corresponding to a Mobile IP home agent for the UE and a module 1904 for transmitting information corresponding to the global address of the mobile IP home agent in response to the request.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for identifying a Mobile Internet Protocol (MIP) home agent (HA) in a wireless communication system, comprising:
   identifying a Packet Data Network Gateway (PDN GW) serving as an anchor point of a network-based mobility protocol used for communication in the wireless communication system;
   communicating one or more messages to the identified PDN GW containing respective requests for a MIP HA address;
   receiving information relating to the MIP HA address from the PDN GW in response to the one or more messages, wherein the information relating to the MIP HA address is provided by the PDN GW when the HA is collocated with the PDN GW, and wherein the information relating to the MIP HA address comprises information provided by a different device when the HA is not collocated with the PDN GW; and
   de-attaching from the PDN GW and re-attaching to a different PDN GW associated with the different device if the information relating to the MIP HA address indicates that the MIP HA is collocated with the different device.

2. The method of claim 1, wherein:
   the communicating one or more messages comprises communicating a Domain Name System (DNS) query to the PDN GW for a fully qualified domain name (FQDN) corresponding to the MIP HA; and
   the receiving comprises receiving the MIP HA address in response to the DNS query.

3. The method of claim 2, further comprising configuring the FQDN based on an access point name (APN) associated with the MIP HA.

4. The method of claim 2, further comprising configuring the FQDN based on respective identities of a requesting device and a network operator.

5. The method of claim 1, wherein:
   the communicating one or more messages comprises communicating a Router Solicitation message to the PDN GW; and
   the receiving comprises receiving a Router Advertisement message from the PDN GW that indicates a global address for the MIP HA.

6. The method of claim 1, wherein:
   the identifying comprises identifying a PDN GW with which a connection is to be established;
   the communicating one or more messages comprises sending an attach request message to the identified PDN GW; and
   the receiving comprises receiving an attach accept message from the identified PDN GW and an indication of a global address for the MIP HA.

7. The method of claim 6, wherein the global address for the MIP HA is received in a protocol configuration option provided by the attach accept message.

8. The method of claim 6, wherein the global address for the MIP HA is received from a Mobility Management Entity (MME) that is disparate from the PDN GW in a separate message from the attach accept message.

9. The method of claim 1, wherein the network-based mobility protocol is at least one of General Packet Radio Service Tunneling Protocol (GTP) or Proxy Mobile Internet Protocol (PMIP).

10. A method for identifying a Mobile Internet Protocol (MIP) home agent (HA) in a wireless communication system, comprising:
   identifying a Packet Data Network Gateway (PDN GW) serving as an anchor point of a network-based mobility protocol used for communication in the wireless communication system;
   communicating one or more messages to the identified PDN GW containing respective requests for a MIP HA address; and receiving information relating to the MIP HA address from the PDN GW in response to the one or more messages, wherein:

the identifying comprises identifying a serving PDN GW;

the communicating one or more messages comprises communicating a DNS query for the MIP HA to the serving PDN GW;

the receiving comprises receiving a DNS reply from the serving PDN GW that indicates that the MIP HA is collocated with a PDN GW disparate from the serving PDN GW; and the method further comprises de-attaching from the serving PDN GW and re-attaching to the PDN GW indicated in the DNS reply.

11. The method of claim 10, wherein the receiving further comprises receiving a DNS reply from the serving PDN GW that indicates a global address for the MIP HA.

12. The method of claim 10, wherein:

the receiving further comprises receiving a DNS reply that indicates a name of a PDN GW with which the MIP HA is collocated; and the method further comprises receiving a global address of the MIP HA from the PDN GW indicated in the DNS reply upon attachment thereto.

13. A wireless communications apparatus, comprising:

a memory that stores data relating to a home agent (HA) for Mobile Internet Protocol (IP) communication and an access router (AR) that manages the wireless communications apparatus using at least one of Proxy Mobile IP (PMIP) or General Packet Radio Service Tunneling Protocol (GTP); and a processor configured to provide one or more messages to the AR requesting a global address for the HA and to receive information corresponding to the global address of the HA in response, wherein the information corresponding to the global address is provided by the AR when the HA is collocated with the AR, and wherein the information corresponding to the global address comprises information provided by a different device when the HA is not collocated with the AR, wherein the processor is further configured to de-attach from the AR and re-attach to a different AR associated with the different device if the information corresponding to the global address indicates that the HA is collocated with the different device.

14. The wireless communications apparatus of claim 13, wherein the memory further stores data relating to a domain name associated with the HA and the processor is further configured to communicate a Domain Name System (DNS) query to the AR for the domain name associated with the HA and to receive a responsive DNS reply comprising a global address of the HA.

15. The wireless communications apparatus of claim 14, wherein the processor is further configured to configure the domain name associated with the HA based on an access point name (APN) associated with the HA.

16. The wireless communications apparatus of claim 14, wherein the processor is further configured to configure the domain name associated with the HA based on respective identities of the wireless communications apparatus and an operator of the HA.

17. The wireless communications apparatus of claim 13, wherein the processor is further configured to provide a Router Solicitation message to the AR and to receive a Router Advertisement message from the AR in response that includes a global address for the HA.

18. The wireless communications apparatus of claim 13, wherein the memory further stores data relating to an AR with which a communication session is to be established and the processor is further configured to provide an attach request message to the AR with which the communication session is to be established and to receive an attach accept message and an indication of a global address of the HA in response.

19. The wireless communications apparatus of claim 18, wherein the processor is further configured to identify the global address of the HA in a protocol configuration option provided in the attach accept message.

20. The wireless communications apparatus of claim 18, wherein the processor is further configured to receive the global address of the HA from a Mobility Management Entity (MME) that is disparate from the AR in connection with receiving the attach accept message.

21. A wireless communications apparatus, comprising:

a memory that stores data relating to a home agent (HA) for Mobile Internet Protocol (IP) communication and an access router (AR) that manages the wireless communications apparatus using at least one of Proxy Mobile IP (PMIP) or General Packet Radio Service Tunneling Protocol (GTP); and a processor configured to provide one or more messages to the AR requesting a global address for the HA and to receive information corresponding to the global address of the HA in response wherein the memory further stores data relating to a serving AR and a domain name associated with the HA and the processor is further configured to communicate a DNS query to the AR based on the domain name of the HA, to identify a DNS reply from the AR indicating that the HA is collocated with a non-serving AR, and to de-attach from the serving AR and re-attach with the AR at which the HA is located in response to the DNS reply.

22. The wireless communications apparatus of claim 21, wherein the processor is further configured to identify a global address for the HA in the DNS reply.

23. The wireless communications apparatus of claim 21, wherein the processor is further configured to identify a global address for the HA from the AR indicated in the DNS reply during attachment thereto.

24. An apparatus that facilitates discovery of a Mobile Internet Protocol (IP) home agent, the apparatus comprising:

means for communicating a request for a global IP address of a home agent to a Packet Data Network Gateway (PDN GW) serving as an anchor point of a network-based mobility protocol;

means for receiving information relating to the global IP address of the home agent in response to the request, wherein the information relating to the global IP address is provided by the PDN GW when the home agent is collocated with the PDN GW, and wherein the information relating to the global IP address comprises information provided by a different device when the home agent is not collocated with the PDN GW; and means for de-attaching from the PDN GW and re-attaching to a different PDN GW associated with the different device if the information relating to the global IP address indicates that the home agent is collocated with the different device.

25. A non-transitory machine-readable medium having stored thereon instructions which, when executed by a machine, cause the machine to perform operations comprising:

identifying a serving access router serving as a network anchor point for one or more of Proxy Mobile Internet Protocol (PMIP) or General Packet Radio Service Tunneling Protocol (GTP);

determining whether a first Mobile Internet Protocol (MIP) home agent (HA) is collocated with the serving access router;

if the first MIP HA is collocated with the serving access router, discovering a global address for the first MIP HA; and if the first MIP HA is not collocated with the serving access router, establishing a connection with an access router at which a second MIP HA is located and discovering a global address for the second MIP HA upon establishment of a connection with the access router.

26. An integrated circuit that executes computer-executable instructions for discovering a global address of a home agent, the instructions comprising:

requesting a global address of a home agent from a Packet Data Network Gateway (PDN GW) serving as an anchor point for at least one of Proxy Mobile Internet Protocol (PMIP) or General Packet Radio Service Tunneling Protocol (GTP) by employing at least one of a Domain Name Service (DNS) query for a domain name configured based on the home agent or a connection attachment procedure;

receiving information relating to the global address of the home agent from the PDN GW, wherein the information relating to the global address is provided by the PDN GW when the home agent is collocated with the PDN GW, and wherein the information relating to the global address comprises information provided by a different device when the home agent is not collocated with the PDN GW, the different device being collocated with the home agent; and de-attaching from the PDN GW and re-attaching to a different PDN GW associated with the different device if the information relating to the global address indicates that the home agent is collocated with the different device.

* * * * *